United States Patent [19]

Mohr et al.

[11] 4,135,368

[45] Jan. 23, 1979

[54] MOTOR VEHICLE AIR-CONDITIONING SYSTEM

[75] Inventors: Paul Mohr, Wolfsburg; Wolf D. Pokowitz, Muden, both of Fed. Rep. of Germany

[73] Assignee: Volkswagenwerk Aktiengesellschaft, Wolfsburg, Fed. Rep. of Germany

[21] Appl. No.: 776,855

[22] Filed: Mar. 11, 1977

[30] Foreign Application Priority Data

Apr. 2, 1976 [DE] Fed. Rep. of Germany ....... 2614290

[51] Int. Cl.² .......................... B60H 3/04; F25B 27/00
[52] U.S. Cl. ........................................ 62/133; 62/243; 62/323
[58] Field of Search ................. 62/133, 239, 241, 243, 62/323

[56] References Cited

U.S. PATENT DOCUMENTS

| 2,746,261 | 5/1956 | Gibson | 62/208 |
|---|---|---|---|
| 3,186,184 | 6/1965 | Pruitt | 62/243 |
| 3,411,310 | 11/1968 | Caldwell | 62/323 |
| 3,462,964 | 8/1969 | Haroldson | 62/133 |
| 3,602,005 | 8/1971 | Kaye | 62/243 |
| 3,606,764 | 9/1971 | Yokouchi et al. | 62/323 |
| 3,678,700 | 7/1972 | Bozich | 62/323 |
| 3,710,587 | 1/1973 | Hayashi | 62/323 |

FOREIGN PATENT DOCUMENTS

2038459  2/1972 Fed. Rep. of Germany.
497989 12/1970 Switzerland.

Primary Examiner—Lloyd L. King
Attorney, Agent, or Firm—Brumbaugh, Graves, Donohue & Raymond

[57] ABSTRACT

A motor vehicle air-conditioning system includes a compressor driven by the motor vehicle engine through a clutch and means for disengaging the clutch, thereby decoupling the compressor from the engine, when the vehicle is accelerating. According to the invention, means are provided for automatically reengaging the clutch after an adjustable period of delay from the time that the clutch is disengaged.

21 Claims, 3 Drawing Figures

MOTOR VEHICLE AIR-CONDITIONING SYSTEM

BACKGROUND OF THE INVENTION

The present invention relates to air-conditioning systems for motor vehicles. More particularly, the invention relates to a motor vehicle air-conditioning system having a compressor driven by the motor vehicle engine through a clutch which is disengaged during the periods of acceleration of the vehicle.

Conventional air-conditioning systems, often provided in motor vehicle for cooling the vehicle passenger compartment, comprise a refrigerant circulation system having a compressor, an evaporator and a condenser. The compressor is driven directly by the vehicle engine. Because of the high power requirements of the compressor, the engine output available for propulsion is often noticeably reduced. Especially in vehicles with small engines, the accelerating ability of the vehicle is therefore diminished, particularly at the lower engine speeds: an effect which sometimes leads to difficulties in traffic. To overcome this disadvantage, it is known to couple the compressor to the engine via a clutch which is automatically disengaged during periods of acceleration of the vehicle.*

*The terms "acceleration" and "accelerating", as used throughout this specification, are intended to include all instances in which maximum available engine output is called for. For example, this term is intended to include the situation in which the vehicle is "lugging" uphill at wide-open-throttle but is not actually increasing in speed.

The U.S. Pat. No. 3,462,964, discloses a particular air-conditioning system of this type in which the compressor is disconnected from the engine by means of a control mechanism acting on the compressor clutch and governed by the vacuum present in the intake manifold of the engine. During acceleration of the vehicle, when the vaccum is reduced to a selected minimum value, the control mechanism is activated. This prior art arrangement has the disadvantage that, depending upon the vacuum conditions of the engine, the compressor of the air-conditioner may sometimes remain shut off for a considerable period of time.

An object of the present invention is to provide an air-conditioning system of the type described above which is designed to avoid any prolonged disconnection of the compressor.

SUMMARY OF THE INVENTION

This object, as well as other objects which will become apparent from the discussion that follows, are achieved, according to the invention, by providing means for automatically reconnecting the compressor to the engine after an adjustable period of time: preferably only a fraction of the average period of acceleration, for example from 3 to 7 seconds.

According to the invention, therefore, the compressor is disconnected from the engine in the usual manner when the vehicle commences to accelerate, but it is then automatically reconnected after a fixed length of time. Prolonged periods of inoperation of the compressor are thereby avoided. There will, at most, be an intermittent disconnecting and connecting of the compressor.

In one preferred embodiment of the invention a first electrical switch is provided for automatically interrupting the energizing circuit of the clutch, which is an electromagnetically-actuated (magnetic) clutch, and a second electrical switch is provided for automatically reclosing the energizing circuit after a lapse of time determined by a delay element which is automatically started at the time that the magnetic clutch is disengaged.

The first electrical switch is preferably in the form of a vacuum-actuated switch having a first fixed contact connected to the excitation winding of the magnetic clutch and a second fixed contact connected to the delay element. The movable contact of the vacuum-actuated switch is shifted from the first to the second fixed contact when the vacuum in the engine intake falls below a selected (adjustable) minimum value. Thus, in this case the movable switch contact interrupting the energizing current to the magnetic clutch is at the time employed to switch on the delay element.

In an advantageous refinement of the invention, a time-delay working current relay having a relay winding is connected to the second fixed contact of the vacuum-actuated switch. The normally-open movable contact of this relay is connected in the energizing circuit of the magnetic clutch, either directly or indirectly, between the excitation winding of the clutch and a source of current. The time delay in this instance is preferably effected by an electronic delay circuit arranged in the energizing circuit of the working current relay.

In another advantageous refinement of the invention, the second fixed contact of the vacuum-actuated switch is connected to the excitation winding of an electromagnetically-actuated pneumatic valve which switches on a negative-pressure switch after a prescribed delay. The negative-pressure switch has a switch contact connected, either directly or indirectly, between the excitation winding of the magnetic clutch and the source of current supplying the clutch. Thus, instead of an electronic element, this arrangement employs a pneumatic element to generate the desired time delay. In this case the pneumatic valve is preferably connected between the negative-pressure switch and a vacuum reservoir that is in communication with the engine intake. The pneumatic valve serves to interrupt a normally open line connection from the negative-pressure switch to the atmosphere and to open a normally closed line connection from the negative-pressure switch to the vacuum reservoir. A throttling constriction is provided in the line between the negative-pressure switch and the vacuum reservoir, to effect the delay in the operation of the negative pressure switch after actuation of the pneumatic valve.

In another preferred embodiment of the invention a single working current relay serves both to interrupt and to reconnect the energizing circuit for supplying current to the magnetic clutch. The switch contact of this relay, which is normally closed when the relay is inactive, is arranged in the energizing circuit of the magnetic clutch. The excitation winding of this relay is connected, in series with a switch contact of a negative-pressure switch and an electronic switch, to a source of voltage. The electronic switch is switched on when the relay switch contact closes and is switched off an adjustable time delay thereafter by an associated delay element. The switch contact of the negative-pressure switch is closed whenever the engine intake vacuum falls below a selected minimum value.

In this embodiment of the invention only one of the switch contacts, namely that of the working current relay, is required to carry the comparatively large energizing current of the magnetic clutch. The other switch contact, namely that of the negative-pressure switch, need only handle the comparatively small energizing current of the relay.

For a better understanding of the invention, together with other and further objects, reference is made to the following description, taken in conjunction with the accompanying drawings, and its scope will be pointed out in the appended claims.

DESCRIPTION OF THE PREFERRED EMBODIMENTS

Figure 1:
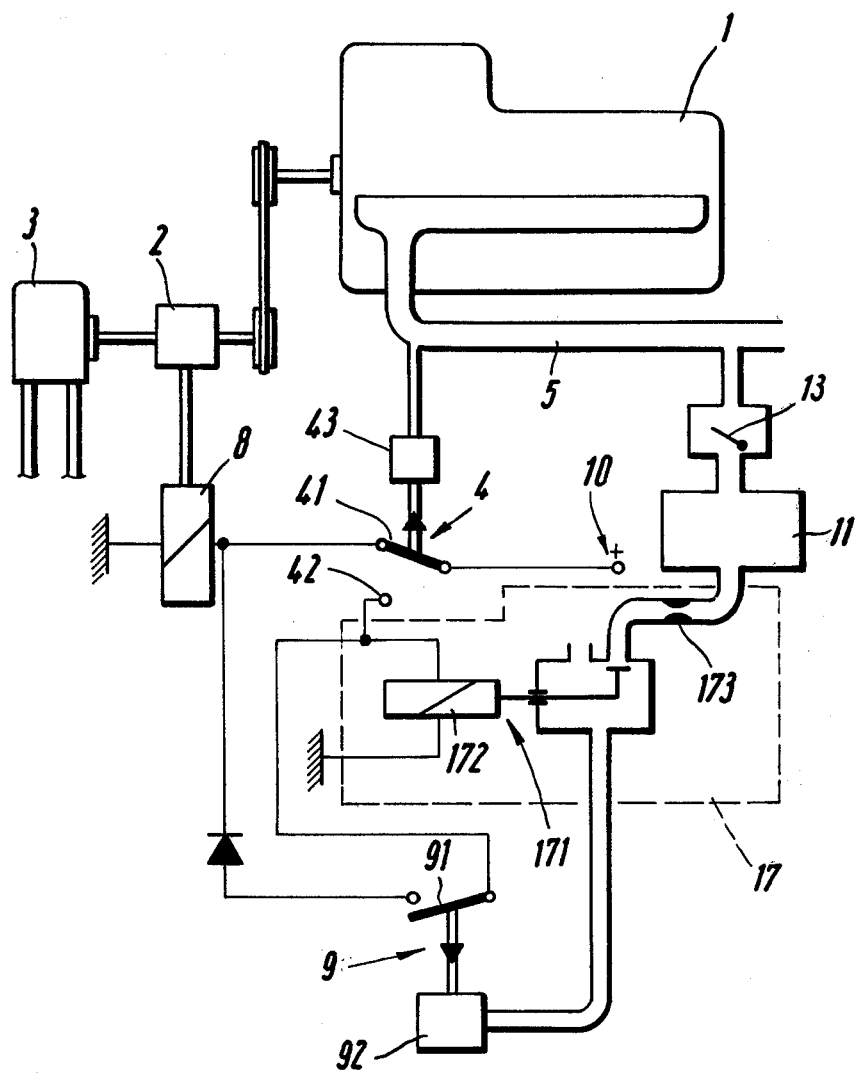
FIG. 1 is a schematic diagram of an arrangment according to the present invention having an air-conditioning compressor driven by a motor vehicle engine through a magnetic clutch. After disconnection from the engine, the compressor is reconnected by means of a pneumatically-actuated delay element.

The figures show part of an air-conditioning system for a motor vehicle having a spark-ignited (gasoline) engine 1. The system includes a compressor 3, driven by the engine 1 by means of a clutch 2. This clutch is an electromagnetic clutch comprising an energizing winding 8 which is supplied current from a suitable source of voltage 10. As is conventional, the magnetic clutch operates to connect the compressor 3 to the engine 1 when a current passes through the energizing winding 8, and to disconnect the compressor from the engine when the energizing current is interrupted. The energizing circuit of the magnetic clutch includes a vacuum-actuated electrical switch 4 having a vacuum-responsive transducer 43 in communication with the intake pipe or manifold 5 of the engine 1. The vacuum-responsive device 43 is designed to switch the movable contact of the electrical switch 4 from the first fixed contact 41, connected to the energizing winding 8 of the magnetic clutch, to the second fixed contact 42, connected to a delay element 17, whenever the vacuum in the intake 5 is reduced to an adjustable minimum value; e.g., upon acceleration of the vehicle due to the opening of the throttle. Thus the compressor 3 is automatically disconnected from the engine 1 at the beginning of each period of acceleration, so that the full engine output is available to accelerate the vehicle.

In accordance with the present invention, the disconnected compressor 3 is automatically reconnected to the engine 1 after an adjustable period of time, independently of the level of vacuum in the intake 5. For this purpose, there is provided an electrical switching device which automatically closes the interrupted energizing circuit of the magnetic clutch 2 after the lapse of the selected delay. In the embodiment of FIG. 1, this electrical switching device includes a negative pressure switch 9 that operates to reenergize the magnetic clutch 2 by closing its electrical contact 91. The delay period is determined in this case by the delay element 17. The latter consists essentially of a magnetic valve 171 having an energizing winding 172 which is connected to the source of current 10 when the contact of the electrical switch 4 is switched from the first fixed contact 41 to the second fixed contact 42 upon disengagement of the magnetic clutch 2. As may be seen from the block diagram, the resulting excitation of the energizing winding 172 causes the normally open line or connection between the vacuum-responsive transducer 92 of negative pressure switch 9 and the atmosphere to be interrupted, and opens a normally interrupted line from the transducer to a vacuum reservoir 11 in communication with the intake 5. The vacuum-responsive transducer 92, which was originally exposed to atmospheric pressure, is thereby subjected to a pressure that declines from atmospheric to the negative pressure prevailing in the vacuum reservoir 11. This pressure equalization does not take place abruptly, but gradually, because a throttling constriction 173 is provided in the line between negative pressure switch 9 and the vacuum reservoir 11. The constriction 173 and the transducer 92 are so proportioned that the time which elapses until the negative pressure acting on the vacuum-responsive transducer has reached the response threshold of the negative pressure switch 9 is only a fraction of the average vehicle acceleration time. Preferably the design is such that this period of delay—that is, the time between actuation of the electrical switch 4 and response of the negative pressure switch 9—is in the range of between 3 and 7 seconds. It will be seen that the actuation of the electrical contact 91 eliminates the interruption of the energizing circuit of the magnetic clutch 2 occasioned by action of the electrical switch 4, since the energizing current supplied by the voltage source 10 is then able to pass by way of the second fixed contact 42 thereof, and the movable contact 91 of the negative pressure switch 9, to the energizing winding 8. This reconnection of the compressor 3 to the engine 1 takes place independently of the negative pressure present in the intake 5, after the aforementioned lapse of time.

Should the vacuum in the intake 5 rise above the adjustable minimum value prior to the expiration of the delay, the compressor 3 will be reconnected at the time this occurs because the movable contact of the electrical switch 4 will then be shifted back from the second fixed contact 42 to the first fixed contact 41.

In the example shown in FIG. 1, the electrical switch contact 91 is connected to the second fixed contact 42. Alternatively, however, it may be connected directly to the source of voltage 10, so that only one switch contact at a time is in the energizing circuit of the magnetic clutch 2. The example also shows that the vacuum reservoir 11 is connected to the intake 5 through a check valve 13. This check valve ensures that there will be a sufficiently high negative pressure in the vacuum reservoir at all times to actuate the negative pressure switch 9.

Figure 2:
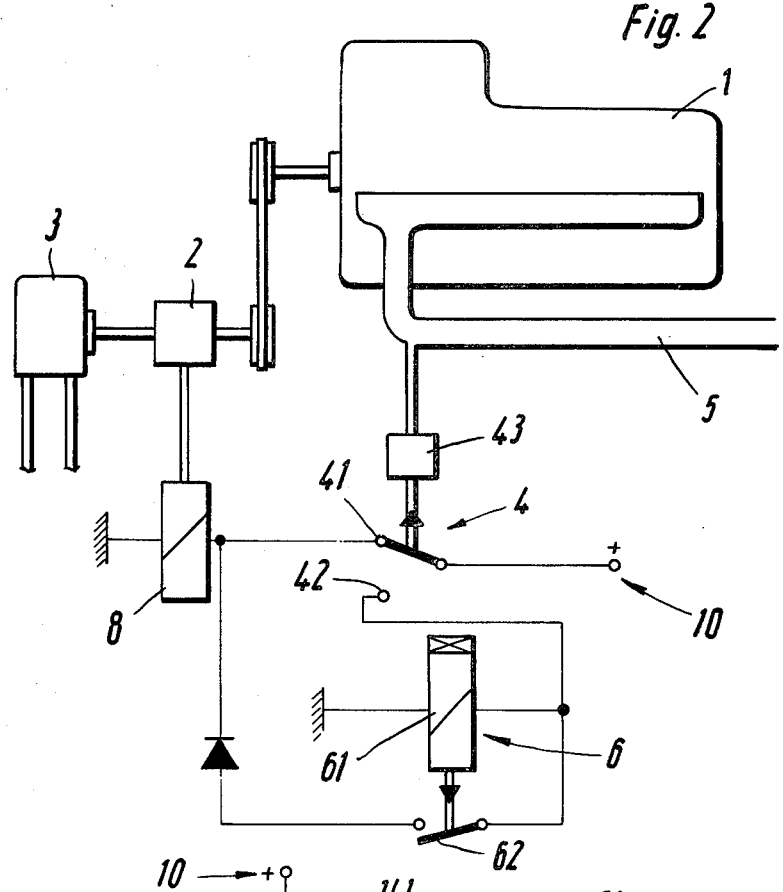
FIG. 2 is a schematic diagram of an arrangement similar to that of FIG. 1 in which the compressor is reconnected by means of an electrical time-delay power relay.

The desired delayed automatic reengagement of the magnetic clutch may be accomplished electrically or electromagnetically rather than by pneumatic means. FIG. 2 shows an arrangement in which the delay element determining the period of time delay is a time-delay working current relay 6. The winding 61 of this relay is connected to the second fixed contact 42 of the vacuum-actuated electrical switch 4. The mode of operation of this embodiment is essentially the same as that of the embodiment of FIG. 1. As soon as the vacuum present in the intake 5 reaches the adjusted negative pressure minimum, the energizing circuit of the magnetic clutch 2 is interrupted by movement of the contact of the electrical switch 4 from the first fixed contact 41 to the second fixed contact 42, and the delay element represented by the working current relay 6 is switched on. In this example, the working current relay is a relay with a magnetic response delay. The desired time delay of the working current relay may alternatively be achieved with an electronic delay circuit arranged in the energizing circuit of the relay. After the expiration of the period of delay, the normally open relay contact 62 closes, so that the energizing winding 8 of the magnetic clutch is connected to the source of voltage 10 via the contact 62 and the movable contact, switched to the second fixed contact 42, of the electrical switch 4. Alternatively, the switch contact 62 may also be connected directly to the source of voltage instead of to the second fixed contact 42.

Figure 3:
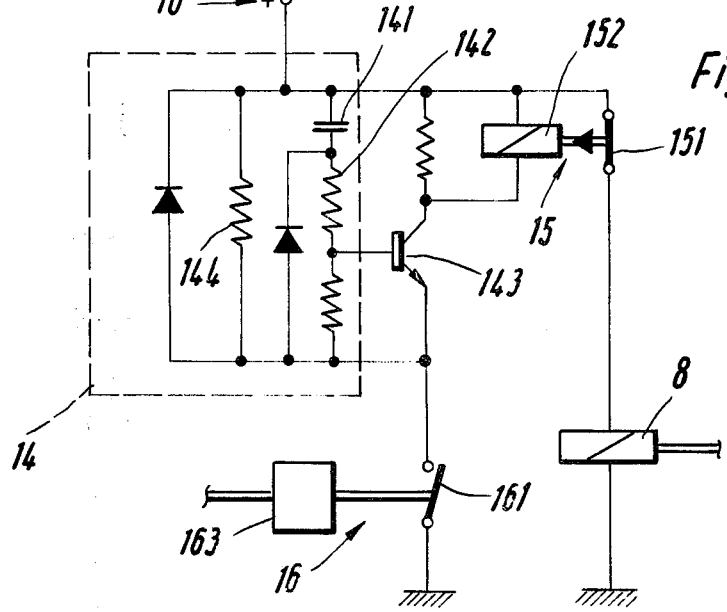
FIG. 3 is a schematic diagram of an arrangment similar to that of FIG. 2 in which the compressor is reconnected by an electrical power relay cooperating with an electronic time-delay circuit.

FIG. 3 shows another possible embodiment for effecting a time-delayed reconnection of the compressor 3 once it has been switched off during the early part of a period of acceleration of the vehicle. In this example, several of the elements shown in FIGS. 1 and 2—that is, the engine 1, clutch 2 and the compressor 3—have been omitted for the sake of greater clarity. In contrast to the embodiments of FIGS. 1 and 2, only a single circuit element, namely a working current relay 15, is provided for interrupting and reclosing the energizing circuit of the magnetic clutch (shown only as the winding 8). As shown in FIG. 3, a normally closed relay contact 151 of the relay 15 is arranged in the energizing circuit of the magnetic clutch. Thus the winding 8 of the clutch is connected to the voltage source 10 by way of the closed contact 151, so that the compressor is coupled to (driven by) the engine 1, during normal operation. (As in the case of FIGS. 1 and 2, it is assumed that the air-conditioning system has been turned on by operation of controls in the passenger compartment.) As soon as the vacuum in the intake 5 has dropped to the selected minimum value during a period of acceleration of the vehicle, the normally open electrical contact 161 of a negative pressure switch 16 is closed by its vacuum-responsive transducer 163, which is in communication with the intake 5. A previously non-conducting electronic switch 143 is thereby rendered conducting, so that current passes from the voltage source 10, through the winding 152 of the working current relay 15, the electronic switch 143 and the closed electrical contact 161 to ground, opening the relay contact 151 and thereby interrupting the energizing circuit of the magnetic clutch winding 8. A delay element 14 associated with the electronic switch 143 renders it non-conducting again after the lapse of a selected delay, disconnecting the voltage from the working relay 15, so that the relay contact 151 closes and again energizes the winding 8 of the magnetic clutch. In the embodiment shown, the electronic switch 143 is a transistor. It is non-conducting when the contact 161 is open. As soon as this contact is closed, a control current charging the capacitor 141 passes through the resistor 142 as well as the junction of the transistor, so that the transistor conducts and the winding 152 of relay 15 carries the aforesaid energizing current. As soon as the capacitor 141 is charged (the charging interval may be adjusted to the desired time delay by suitable choice of values for the capacitor and the resistor 142), the transistor is rendered non-conducting again because of the absence of control current, cutting off the energizing current for the working current relay 15. The relay contact 151 therefore closes so that the magnetic clutch and with it the compressor are switched on again, as desired, after the expiration of the selected period of delay.

If the air-conditioning system according to the invention is not used in a motor vehicle with a spark-ignited engine (as shown in the embodiments of FIGS. 1-3), but in a Diesel powered vehicle where no suitable vacuum is available, the clutch may be disengaged in known manner, not by negative pressure in the intake, but by the accelerator pedal linkage. Such an arrangement is disclosed, for example, in FIG. 2 of the U.S. Pat. No. 3,462,964 and in the U.S. Pat. Nos. 2,746,261 and 3,186,184.

While there have been described what are believed to be the preferred embodiments of the invention, those skilled in the art will recognize that various changes and modifications may be made thereto without departing from the spirit of the invention, and it is intended to claim all such embodiments as fall within the true scope of the invention.

We claim:

1. In an air-conditioning system for a motor vehicle having a compressor driven by the motor vehicle engine through a clutch, and having means for disengaging said clutch, thereby decoupling said compressor from said engine, when the vehicle is accelerating; the improvement comprising time delay means, actuated by the disengaing of said clutch, for automatically reengaging said clutch after a predetermined, fixed period of delay from the point of time that said clutch is disengaged.

2. The air-conditioning system defined in claim 1, wherein said period of delay is less than the average period of acceleration for a motor vehicle.

3. The air-conditioning system defined in claim 2, wherein said period of delay is in the range of from 3 to 7 seconds.

4. The air-conditioning system defined in claim 1, wherein said clutch includes an electromagnet for actuation thereof; wherein said system further comprises circuit means for supplying an energizing current to said clutch electromagnet; wherein said clutch disengaging means includes first electrical switch means, connected in said circuit means, for automatically interrupting said energizing current to said clutch electromagnet when the vehicle is accelerating; and wherein said clutch engaging means includes a second electrical switch means, connected in said circuit means, for automatically resupplying said energizing current to said clutch electromagnet after said adjustable period of delay.

5. The air-conditioning system defined in claim 4, wherein said second electrical switch means includes a delay element for determining said period of delay, and means for turning on said delay element when said first switch means interrupts said energizing current to said clutch electromagnet.

6. The air-conditioning system defined in claim 5, wherein said first electrical switch means includes a vacuum-actuated switch having a movable contact, a first fixed contact connected to said clutch electromagnet, a second fixed contact connected to said delay element, and means for shifting said movable contact from said first fixed contact to said second fixed contact when a vacuum falls below a selected minimum value.

7. The air-conditioning system defined in claim 6, wherein said vacuum is the intake vacuum of said engine.

8. The air-conditioning system defined in claim 6, wherein said movable contact of said vacuum-actuated switch is connected to a source of voltage.

9. The air-conditioning system defined in claim 6, wherein said second electrical switch means includes a time-delay working current relay having a relay winding connected to said second fixed contact of said vacuum-actuated switch and having a switch contact connected in said circuit means for supplying said energizing current to said clutch electromagnet when said relay winding is energized.

10. The air-conditioning system defined in claim 9, wherein said switch contact of said working current relay is a normally open contact.

11. The air-conditioning system defined in claim 9, wherein said switch contact of said working current relay is connected between said clutch electromagnet and a source of voltage.

12. The air-conditioning system defined in claim 11, wherein said switch contact of said working current relay is connected between said clutch electromagnet and said second fixed contact of said vacuum-actuated switch.

13. The air-conditioning system defined in claim 9, wherein said working current relay includes an electronic delay circuit connected to energize said relay winding after said time delay.

14. The air-conditioning system defined in claim 6, wherein said delay element includes an electromagnetically-actuated pneumatic valve having an energizing winding connected to said second fixed contact of said vacuum-actuated switch; and wherein said second electrical switch means further includes a negative pressure switch having a switch contact connected in said circuit means for supplying said energizing current to said clutch electromagnet when said negative pressure switch is turned on, said negative pressure switch being pneumatically turned on a selected delay time after said pneumatic valve is actuated.

15. The air-conditioning system defined in claim 14, wherein said switch contact of said negative pressure switch is a normally open contact.

16. The air-conditioning system defined in claim 14, wherein said switch contact of said negative pressure switch is connected between said clutch electromagnet and a source of voltage.

17. The air-conditioning system defined in claim 14, wherein said switch contact of said negative pressure switch is connected between said clutch electromagnet and said second fixed contact of said vacuum-actuated switch.

18. The air-conditioning system defined in claim 14, wherein said delay element further includes a vacuum reservoir pneumatically connected to the engine intake and a pneumatic line, having a throttling constriction, connected between said vacuum reservoir and said negative pressure switch; wherein said pneumatic valve is arranged in said pneumatic line and includes means for connecting said negative pressure switch to the atmosphere when in the unswitched condition and means for connecting said negative pressure switch to said vacuum reservoir when in the switched condition.

19. The air-conditioning system define in claim 1, wherein said clutch includes a electromagnet for actuation thereof; wherein said system further comprises circuit means for supplying and energizing current to said clutch electromagnet; wherein said clutch disengaging means includes a working current relay having a relay winding and a normally closed switch contact, connected in said circuit means, for interrupting said energizing current to said clutch electromagnet when said relay winding is energized; wherein said clutch disengaging means further includes a negative pressure switch for supplying energizing current to said relay winding when a vacuum applied thereto falls below a selected minimum value; and wherein said clutch engaging means includes electronic switch means for interrupting the energizing current to said relay winding an adjustable delay time after said negative pressure switch is actuated.

20. The air-conditioning system defined in claim 19, wherein said relay winding, said negative pressure switch and said electronic switch are connected in series.

21. The air-conditioning system defined in claim 19, wherein said vacuum is the intake vacuum of said engine.

* * * * *